United States Patent [19]

Palmquist et al.

[11] 4,268,118

[45] May 19, 1981

[54] SHEETING USEFUL AS A PROJECTION SCREEN

[75] Inventors: Philip V. Palmquist, Maplewood; Thomas I. Bradshaw, Afton, both of Minn.

[73] Assignee: Minnesota Mining and Manufacturing Company, St. Paul, Minn.

[21] Appl. No.: 72,661

[22] Filed: Sep. 5, 1979

[51] Int. Cl.³ .............................................. G03B 21/60
[52] U.S. Cl. .................................................. 350/128
[58] Field of Search ............... 350/128, 129, 117, 103, 350/109, 167

[56] References Cited

U.S. PATENT DOCUMENTS

| | | | |
|---|---|---|---|
| 2,660,927 | 12/1953 | Burton | 350/129 |
| 2,984,152 | 5/1961 | Mihalakis et al. | 350/129 |
| 3,063,339 | 11/1962 | Mihalakis et al. | 350/129 |
| 3,214,234 | 10/1965 | Bottomley | 8/180 |
| 3,408,132 | 10/1968 | Chandler et al. | 350/125 |
| 3,492,060 | 1/1970 | Sherwood | 350/117 |
| 3,811,750 | 5/1974 | Coulthard | 350/129 |
| 4,089,587 | 5/1978 | Schudel | 350/129 X |

FOREIGN PATENT DOCUMENTS 2655527  4/1978  Fed. Rep. of Germany .

Primary Examiner—Richard A. Wintercorn
Attorney, Agent, or Firm—Cruzan Alexander; Donald M. Sell; Roger R. Tamte

[57] ABSTRACT

Sheeting useful as a projection screen, especially for projection television, comprises a transparent film that is configured on its back surface with a random pattern of generally parallel elongated microscopic recesses or projections, is reflectively coated on that surface, and is configured on its front surface with lenticular light-refracting recesses or projections that spread light entering and leaving that surface. The screen is generally oriented during use so that the elongated recesses or projections in the back surface are arranged vertically. Light projected at the screen enters and is refracted at the front surface, is reflected by the back surface, and is refracted again at the front surface to provide bright images visible with good uniformity to a widely distributed audience.

8 Claims, 3 Drawing Figures

SHEETING USEFUL AS A PROJECTION SCREEN

BACKGROUND OF THE INVENTION

A major goal in the projection television industry is to increase the brightness, contrast, uniformity at different viewing positions, and other aspects of the projected television image as it is viewed on a projection screen. This goal has prompted many research efforts, both in projection equipment and projection screens; but despite these efforts, significant improvement is still needed before broad and satisfying use of projection television can be expected.

At present, the screens most widely used for projection television are made from sheeting described in Chandler et al, U.S. Pat. No. 3,408,132, which comprises aluminum foil having a wrinkled surface prepared by compression rolling two sheets of the foil together under high pressure. This sheeting offers improvement in brightness of image over prior commercial beaded or lenticular projection screens, but it has a number of significant disadvantages—(a) an extreme susceptibility to damage, such that even a slight rubbing of the screen to clean it deforms the wrinkled metal surface and leaves a lasting blemish (some reduction of this problem has recently been achieved with oxide coatings applied to the metal foil surface); (b) a level of reflection that is too low to permit satisfactory viewing in lighted environments, such as a normally daylit-room; and (c) limitations in the angular range of reflection by the screen (because of such limitations in angular range, the wrinkled-foil screens are given a compound (horizontal and vertical) curvature to condense or aim the reflections at an audience; this compound curvature is achieved by adhesively mounting the sheeting on compound-curved substrates, which is an expensive, mistake-prone procedure; and even with the compound-curved screen the images projected by multi-tube color projection televisions, which typically comprise three side-by-side projection tubes each projecting a different color, take on a different hue or tint depending on the horizontal displacement of a viewer from the central projection axis).

Screens taught in Schudel, U.S. Pat. No. 4,089,587, were developed in response to some of the deficiencies of wrinkled-foil screens. The Schudel screens comprise a transparent polymeric film formed with minute vertical striations in one surface, a random matte texture in that or an opposite surface, and a layer of reflective material such as vapor-deposited aluminum on one of the surfaces. The film is adhered to a substrate, preferably with the metallized surface adhered against the substrate to provide durability.

The Schudel screens provide a very bright image to viewers who are close to the projection axis, and can be much more durable than the wrinkled-foil screens. Nevertheless, they have found only a limited acceptance, primarily because of the limited angular range of reflection from the screens. Outside a range of about plus-or-minus 5 degrees of the projection axis, the brightness of the image declines very rapidly.

A different approach not yet brought to commercial use is described in German Pat. No. 2,655,527. This approach relies on an oriented film of foamed polypropylene, such as described in Bottomley, U.S. Pat. No. 3,214,234. The orientation or stretching process leaves the exterior surface of the film densely packed with a random pattern of generally parallel elongated microscopic projections or recesses. The German patent teaches that when this surface is metallized, i.e., provided with a specularly reflective coating of vapor-deposited metal, it may be used as a projection screen for projection television and the like. The patent also suggests that a foamed film may be used as a master, for example, by forming a metal copy of the surface and using the metal copy to stamp the foamed surface into a plastic film, which itself can then be stretched and metallized.

We have tested metallized oriented foamed polypropylene projection screens as described in the German patent and find that they have good brightness; but there is an undesirable variation in brightness as a viewer moves from a position directly behind the projector. For example, by our measurements, such screens have a gain factor[1] of 39 at a 0° divergence angle, but the gain factor is only 29, or 67 percent of its 0° value, at a horizontal divergence angle of 10°. The gain factor further declines to 45 percent of the 0° value at 20° horizontal divergence, and to 29 percent at 30° horizontal divergence. At the same time, the screen has a very narrow vertical distribution of light, with a gain factor at a vertical divergence angle of 5° of only 6 percent of its 0° value. The extremely narrow vertical distribution is a major drawback, since for viewers to see a projected image on sheeting with such a distribution would require that they be in a single row and all have the same eye level.

[1] Gain factor is the ratio of the reflection from a screen under consideration and the reflection from a standard white diffusing surface under the same illumination, and is stated as the number of times that the screen is brighter than the standard white diffusing surface. The gain factors reported herein were measured on a goniophotometer made by Gardner Laboratory, Inc., Bethesda, Md., Model No. GG 9204. With this instrument, light is beamed at the screen being tested on a line that is horizontally spaced about 15° from a line perpendicular to the screen. Measurements are read with a sensor placed on the side of the perpendicular line opposite from the projected beam. When the sensor is at a position horizontally spaced 15° on the side of the perpendicular line opposite from the projected beam (thus measuring the reflection at an angle equal and opposite to the angle of incidence), the measurement is regarded as the reflection at a 0° divergence angle. This reading should be the peak reflection, since, as in specular reflection, the reflection is greatest when the angle of reflection is equal and opposite from the angle of incidence. When the sensor is positioned 25° on the side of the perpendicular line opposite from the projected beam, the reflection measured is regarded as the reflection at a 10° divergence angle; the 35° reading is the reflection at a 20° divergence angle; etc.

Prior to the commercial introduction of projection television, other attempts had been made to provide projection screens that were brighter than lenticular or beaded screens, which typically exhibit gain factors of less than 5. Burton, U.S. Pat. No. 2,660,927, describes a screen made from a clear piece of transparent material such as glass, the back of which is formed with a sinusoidal pattern of closely spaced vertical ribs; the back ribbed surface of the glass is mirror-plated, and the front surface is roughened sufficiently to remove glare. Disadvantages with this screen include the fact that a surface of regular configuration often produces scintillation, i.e., a flash of brilliant reflection from the screen seen at certain angles, which disrupts viewing of a projected image, and glass is heavy and fragile.

Sherwood, U.S. Pat. No. 3,492,060, teaches a screen offered as an improvement over the Burton screen, and which comprises a translucent sheet spaced in front of a reflective rear sheet corrugated with alternate ridges and grooves. This screen also suffers from scintillation, and in addition the spaced construction makes the product difficult to manufacture and apply to a substrate.

Mihalakis, U.S. Pat. No. 2,984,152, and Mihalakis et al, U.S. Pat. No. 3,063,339, also describe screens having a regular pattern of curved reflective surfaces. In the '152 patent, the reflective surfaces are vertical corrugations that undulate along their vertical length. The '339 patent teaches a more generalized surface designed to provide a desired field of observation; and a diffusing coating is applied over the configured surface. The '152 patent states that screens as described can be manufactured by preparing by hand a larger-than-scale model, and then preparing an embossing master by copying the model in reduced scale "on a three dimensional engraving machine of conventional design employing the pantograph principle." So far as known, no commercial sheeting of this type has ever appeared and in any event the sheeting would presumably suffer from scintillation.

SUMMARY OF THE INVENTION

The present invention provides a new sheeting, and durable long-lived projection screens made from the sheeting, which are capable of brightly reflecting images with good uniformity across a widely distributed audience. Briefly, this new sheeting comprises a transparent film that is configured on its back surface with a random pattern of densely packed generally parallel elongated microscopic recesses or projections, which are concave or convex in both their longitudinal and transverse directions; and is configured on its front surface with densely packed light-refracting lenticular recesses or projections that spread light entering and leaving the front surface. A specularly reflective layer such as vapor-deposited aluminum is coated on the configured back surface, and a layer of adhesive is preferably disposed over the specularly reflective layer for adhering the sheeting to a backing or substrate.

The combination of reflecting and refracting recesses or projections produces a unique reflection and distribution of projected light. The sheeting is generally used with the elongated light-reflecting recesses or projections oriented vertically, whereby these recesses or projections cause a horizontal spreading of light. The light-refracting recesses or projections on the front surface enhance this horizontal spreading and also achieve vertical spreading.

The random pattern of light-reflecting recesses or projections on the back surface of the film is preferably provided as a positive or negative replicate of a stretched foamed film of the type described above, and the light-refracting recesses or projections on the front surface are also preferably a positive or negative replicate of such a stretched foamed film. Sheeting having such replicated front and back surfaces has greater numbers of light-refracting (front surface) and light-reflecting (back surface) recesses or projections across the horizontal axis than across the vertical axis, and the surfaces of the individual recesses or projections are more steeply inclined (i.e., form a larger angle with respect to the plane of the sheeting) along the horizontal axis than along the vertical axis; and this greater number and steeper inclination of recesses or projections causes a preferential spreading of projected light in the horizontal direction upon initial entry of projected light rays into the film, upon reflection at the back surface of the film, and upon departure of reflected rays from the film. Along with increased horizontal spreading of light, the light-refracting recesses or projections increase vertical spreading, which greatly enhances the utility of sheeting of the invention over that possible with the metallized foamed polypropylene described above.

Sheeting of the invention can be tailored to provide different distributions of light as needed. However, even with the brightest expected projection television equipment, the screen should presumably exhibit a gain factor at a 0° divergence angle of at least 5, and more typically, gain factors of at least 10 or 15 at a 0° divergence angle will be desired and can be achieved with sheeting of the invention. To achieve good uniformity at horizontal viewing positions, the gain factors at angles of 10°, 20°, and 30° are typically at least 75 percent, 50 percent, and 25 percent of the 0° value, and preferably are at least about 85 percent, 60 percent, and 35 percent of the 0° value. Very importantly, good contrast between a projected image and background is retained with screens of the invention even in the presence of overhead lighting, since such lighting tends to be reflected to the floor instead of to the audience. Also of importance for the most common present-day color projection televisions, screens made from sheeting of the invention provide good color uniformity across a horizontally distributed audience even when the image is projected by multiple side-by-side projection tubes for different colors. Also, the projected images on the screens tend to be free of scintillation and "hot spots."

Sheeting of the invention is conveniently applied to a substrate, which is normally curved around only one axis, with the back surface of the transparent film that carries the specularly reflecting layer being disposed toward the substrate. The transparent film thus overlies and protects the reflecting surface against abrasion, and screens made from sheeting of the invention are durable under all normal and expected handling conditions and may be washed as necessary.

While a primary use for sheeting of the invention is as a screen for projection television, the sheeting has other uses, such as a screen for movie or slide projectors; display screens for use in advertising displays (i.e., in which a slide transparency is projected at the screen), optometry screens, etc. The optical properties of the screen may be varied for such uses. For example, a lower-gain screen may be desirable for home slide or movie projectors.

Figure 1:
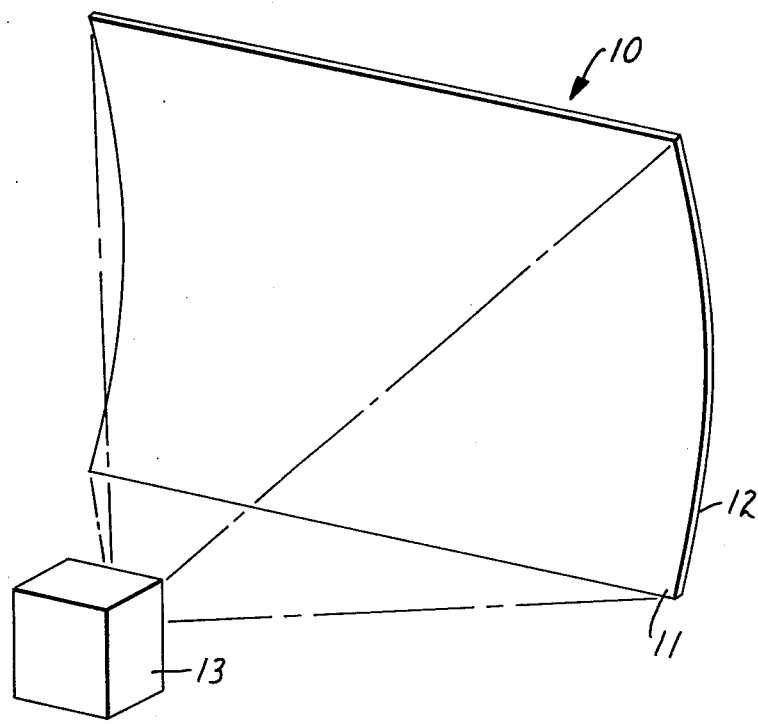
FIG. 1 is a perspective view of a projection screen 10 comprising an illustrative sheeting of the invention 11 adhered to a substrate 12. A projector 13, which may be a television projector, movie or slide projector, or the like, beams images to the screen, where they are reflected to an audience. The substrate is slightly cylindrically curved about a horizontal axis to vertically concentrate or aim light rays reflected from the screen to the audience.
Figure 2:
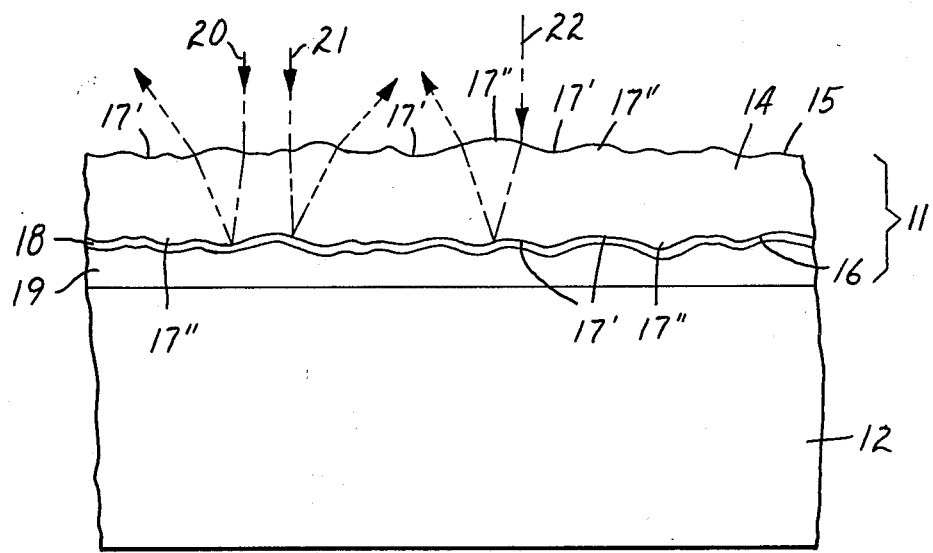
FIG. 2 is a greatly enlarged edge view of the sheeting 11 and substrate 12. The sheeting 11 comprises a transparent film 14 configured on both the front surface 15 and back surface 16 with concave recesses 17' and convex projections 17''. The recesses and projections are elongated and generally parallel to one another, with their longitudinal axes extending perpendicular to the page of the drawings. A specularly reflective layer 18 is coated over the back surface 16, and a layer of adhesive 19 is coated over the specularly reflective layer and adheres the sheeting to the substrate 12.

Representative paths for light rays projected at the sheeting 11 are diagrammed in FIG. 2. Light rays 20, 21, and 22 enter the film 14 at the surface 15, where they are refracted; then travel to the surface 16 and specularly reflective layer 18, where they are reflected; and then return to the front surface 15, where they are again refracted as they leave the film.

Figure 3:

FIG. 3 is a photograph enlarged 200 times over normal scale showing a perspective view of one-half of a representative film 14; the photographed film would be laminated back-to-back with a similar or otherwise configured film to form the complete film 14. The white portion of the edge of the photographed film is a fracture line which occurred when the film was frozen and fractured to form an edge for photographing.

DETAILED DESCRIPTION

The configured surfaces of sheeting of the invention are preferably obtained by casting a liquid film-forming material onto a mold surface, typically a moving mold surface such as a belt or drum. After casting, the material solidifies, as by evaporation of solvent, cooling, or reaction of reactive components, to take the configuration of the mold surface.

Alternatively, embossing techniques can be used, in which an embossing surface is pressed against a softened film, and the film then dried, cooled, or reacted to a solidified state. Combinations of casting and embossing techniques can also be used, as when a first configured surface is formed during casting of a film, and before the film has totally solidified a pattern of light-refracting recesses or projections is embossed into the opposite surface of the film.

Mold or embossing surfaces may be prepared in a variety of ways. As previously stated, a preferred method is to use stretched foamed film as taught in Bottomley, U.S. Pat. No. 3,214,234. This film is prepared by extruding through an orifice a molten mixture of a normally solid polymer and a foaming agent. Cells or bubbles are formed in the film during extrusion, and upon subsequent stretching of the film, the outer cells appear as generally parallel elongated projections in the exterior surface of the film. Some cells collapse during the stretching process to leave generally parallel elongated recesses in the film surface, and recesses are also formed adjacent or between projections. The foamed stretched film can itself be used as a mold surface, or electroform or silicone rubber positive or negative copies may be made from the film to form a more permanent casting or embossing surface. The film photographed in FIG. 3 was obtained using a foamed and stretched film as a mold surface.

A different replicating surface may be prepared by forming a film with a dense pattern of spherical indents or protrusions and then stretching the film. A film with spherical protrusions can be formed by use of a mold prepared by pressing a beaded sheeting (such as reflective sheeting having a monolayer of microspheres partially embedded in the sheeting and partially protruding out of the sheeting) against a soft pliant shape-retaining flat-surfaced sheet or block. The beaded sheeting may be pressed against the sheet or block more than once, with the position of the beaded sheeting slightly changed between pressings, to obtain a desired packing, i.e., with the final recesses or projections contiguous so that essentially no flat surfaces are left from the original flat surface of the sheet. An electroform copy can then be prepared from the resulting mold, or from assemblies of smaller sections of such a mold, and a film cast on this mold.

Another way to form a master is to mechanically indent a soft metal sheet, as by repeatedly impacting the surface with peening wheels having bristles tipped with hard metal shot.

The film in the sheeting of the invention is most often cast or embossed with the recesses or projections in their final shape. However, as indicated above, film can also be provided with a dense pattern of spherical recesses or projections, and then stretched to convert the recesses or projections to an elongated concave or convex shape.

The exact size and shape of the recesses or projections may be varied by using different degrees of elongation of a stretched foamed film master or of cast films, by use of different bead sizes when forming a pressed-bead master, etc., to obtain reflection properties appropriate to a particular use. The recesses or projections will generally be microscopic in size, i.e., best viewed with a microscope, so that individual recesses or projections do not visibly stand out as a viewer looks at the screen.

The concavity or convexity of the recesses or projections is generally very gradual in the longitudinal direction, but contributes to the desirable spreading of light, especially to a vertical spreading of light. The longitudinal concavity or convexity follows from the generally finite length of the recesses or projections (in comparison, for example, to the essentially infinitely long striations of the screen described in the Schudel patent noted above, U.S. Pat. No. 4,089,587). For example, when the surfaces of preferred films cast on stretched foamed polypropylene masters are measured on a Bendix Profilometer using a stylus having a radius of 500 microinches and a tracking weight of 250 milligrams, the ratio of peaks measured in the width direction to peaks measured in the length direction generally varies from 3:1 to 10:1, depending on the height of peaks that are regarded as "noise," i.e., peaks that are very small in height in comparison to the more significant peaks being measured, and which the measuring instrument is adjusted not to count. Insufficient readings are obtained from the Schudel sample in the longitudinal direction of the striations for calculating a meaningful ratio. The ratio of peaks in the width and length direction for sheeting of the invention will be of a finite nature on the order of 25 to 1 or less.

The recesses or projections need not be smoothly concave or convex, although preferred results are generally obtained when the surfaces of the recesses or projections are smooth. However, some imperfections can occur; for example, recesses produced by collapsed bubbles in a stretched foamed polymeric film can have a rough surface left by residue of the collapsed bubble wall. Some imperfections of the surface, producing a scattering of light rays, can be useful to provide a "softer" image, i.e., an image which has minimal glitter caused by concentrations of imaging light rays from individual recesses or projections. Such a softer image can also be achieved by inclusion of light dispersants in the transparent film, e.g., minute transparent particles or liquid droplets dispersed in the film.

The useful light-refracting recesses or projections on the front surface of sheeting of the invention are characterized as lenticular, i.e., the distribution of light from these recesses or projections is ordered rather than random. The needed order may be tested by metallizing a surface in question and measuring the gain factor from the surface. The useful surfaces generally provide a gain at 0° divergence of at least 2 and preferably at least 5 in such a test.

The need for ordered processing of light does not require that the light-refracting recesses or projections be of regular size or shape or be arranged in an ordered manner; to the contrary, a random pattern of refracting recesses or projections is preferred. The refracting recesses or projections can be of the same or different shape and pattern as the reflecting recesses or projections. Besides refracting surfaces that replicate a stretched foamed polymeric film, best success has been obtained with surfaces that replicate the surface of a drum wound with a mono- or multi-filament wire.

As previously indicated, the transparent film in sheeting of the invention can be prepared by laminating two separately prepared films together, by embossing both surfaces of a single film, or by curing material cast between two mold surfaces. The transparent film may be thermoplastic but often is preferably prepared from reactive components which are reacted to a substantially infusible and insoluble state after configuration of the film. Reaction is preferably achieved by exposing the film-forming material to radiation, e.g., heat, light, electron beam, etc., while the material is in liquid form on a mold surface. Useful film-forming materials include polyacrylates or methacrylates (preferably in reactive forms), polyurethanes, polyesters, polycarbonates, polypropylene, and cellulose acetate butyrate.

The specularly reflective layer is conveniently applied by vapor-deposition, usually of a metallic material such as aluminum. An adhesive is usually coated over the specularly reflective layer for adhering the sheeting to a substrate. Pressure-sensitive adhesives are presently preferred, although heat-activated or solvent-activated adhesives may also be used.

The invention will be further illustrated by the following example. A mixture comprising 69.7 weight-percent of an acrylate-terminated polyester-based urethane (Uvithane 893 by Thiokol), 29.8 weight-percent of tetraethylene glycol diacrylate, and 0.5 weight-percent $\alpha,\alpha$-diethoxyacetophenone was prepared and cast with a knife-coater in a 0.09-millimeter thickness onto the subsurface of a stretched foamed polypropylene film as described in Bottomley, U.S. Pat. No. 3,214,234. The foamed film had been stretched lengthwise five times its original dimension. The coated film was passed three times at a rate of 50 feet per minute under two 200-watt-per-square-inch ultraviolet lamps while under a nitrogen atmosphere in a unit supplied by Pittsburgh Plate Glass, Model QC 1202, whereupon the cast mixture reacted to a substantially infusible and insoluble state. The resulting cast film, when stripped from the foamed film and viewed under a microscope, had the general appearance of the film shown in FIG. 3, with one face configured and the other smooth. A layer of pressure-sensitive acrylate adhesive was solution-coated on the smooth face of a length of the cast film and dried, and the smooth face of another length of the film pressed against the adhesive to bond the two lengths of film together. The two lengths of film were oriented so that the recesses and projections in each of the films were parallel to one another. The configured surface of one of the laminated films was then vapor-coated with aluminum, and a layer of pressure-sensitive acrylate adhesive was coated from solution over the specularly reflective layer with a knife-coater.

The reflective properties of the sheeting were measured and it was found that the film had a gain of 17 at 0° divergence, 15 at 10° horizontal divergence, 12.4 at 20° horizontal divergence, 9 at 30° horizontal divergence, and 2.5 at 5° vertical divergence.

What is claimed is:

1. Sheeting useful as a durable projection screen from which images projected onto the front of the screen can be brightly reflected with good uniformity to a widely distributed audience, comprising (1) a transparent film that (a) is configured on its back surface with a random pattern of densely packed generally parallel elongated microscopic recesses or projections, which are concave or convex in both their longitudinal and transverse directions, and (b) is configured on its front surface with densely packed light-refracting lenticular recesses or projections that spread light entering and leaving said front surface, and (2) a specularly reflective layer coated on said back surface.

2. Sheeting of claim 1 in which the lenticular recesses or projections on the front surface are elongated in a direction generally parallel to the recesses or projections on the back surface.

3. Sheeting of claim 1 in which said pattern of recesses or projections on the back surface is a replicate of the surface formed by stretching a foamed polymeric sheet.

4. Sheeting of claims 1 or 3 in which the light-refracting recesses or projections on the front surface are substantially the same as the recesses or projections on the back surface.

5. Sheeting of claim 1 which carries a layer of adhesive disposed over said specularly reflective layer for adhering the sheeting to a backing.

6. Sheeting of claim 1 which exhibits gain factors at 10°, 20°, and 30° divergence angles that are at least 85 percent, 60 percent, and 35 percent of the gain factor at 0° divergence.

7. Sheeting of claim 6 in which the gain factor at 0° divergence is at least 15.

8. A projection screen comprising sheeting of claim 1 adhered to a rigid substrate.

* * * * *